(12) United States Patent
Theckyam et al.

(10) Patent No.: US 12,101,516 B1
(45) Date of Patent: Sep. 24, 2024

(54) VOICE CONTENT SELECTION FOR VIDEO CONTENT

(71) Applicant: Amazon Technologies, Inc., Seattle, WA (US)

(72) Inventors: Saravanan Santhamoorthy Theckyam, Bangalore (IN); Anil Kumar Nelakanti, Bangalore (IN)

(73) Assignee: Amazon Technologies, Inc., Seattle, WA (US)

( * ) Notice: Subject to any disclaimer, the term of this patent is extended or adjusted under 35 U.S.C. 154(b) by 82 days.

(21) Appl. No.: 17/364,448

(22) Filed: Jun. 30, 2021

(51) Int. Cl.
| | |
|---|---|
| *H04N 21/233* | (2011.01) |
| *G06F 40/279* | (2020.01) |
| *G06F 40/58* | (2020.01) |
| *G06V 40/10* | (2022.01) |
| *G10L 15/00* | (2013.01) |
| *G10L 25/54* | (2013.01) |
| *G10L 25/57* | (2013.01) |
| *H04N 21/234* | (2011.01) |
| *H04N 21/239* | (2011.01) |
| *H04N 21/25* | (2011.01) |

(52) U.S. Cl.
CPC ......... *H04N 21/233* (2013.01); *G06F 40/279* (2020.01); *G06F 40/58* (2020.01); *G06V 40/10* (2022.01); *G10L 15/005* (2013.01); *G10L 25/54* (2013.01); *G10L 25/57* (2013.01); *H04N 21/23418* (2013.01); *H04N 21/2393* (2013.01); *H04N 21/251* (2013.01)

(58) Field of Classification Search
None
See application file for complete search history.

(56) References Cited

U.S. PATENT DOCUMENTS

| | | | |
|---|---|---|---|
| 10,930,263 B1* | 2/2021 | Mahyar | G06N 3/088 |
| 2020/0111474 A1* | 4/2020 | Kumar | G10L 15/19 |
| 2021/0224319 A1* | 7/2021 | Ingel | G06F 16/686 |
| 2021/0279427 A1* | 9/2021 | Malik | G06F 40/58 |

\* cited by examiner

*Primary Examiner* — Heather R Jones
(74) *Attorney, Agent, or Firm* — Eversheds Sutherland (US) LLP (57) ABSTRACT

Techniques and apparatus for selecting audio content for a content entity in audio-visual content are described. An example technique involves identifying at least one content entity associated with a content item that is accessible to one or more users in a first language over a communication network. One or more attributes of the at least one content entity are determined. A plurality of audio content samples in a second language are obtained. Each audio content sample includes a different audio sample of a portion of speech of the content entity in the second language. A first audio content sample that satisfies a predetermined condition is determined, based on the plurality of audio content samples and the one or more attributes of the at least one content entity. An indication of the first audio content sample is provided.

18 Claims, 7 Drawing Sheets

VOICE CONTENT SELECTION FOR VIDEO CONTENT

BACKGROUND

The present invention relates to digital video processing, and more specifically, to techniques for selecting voice content for audio-visual content that contains depictions of a content entity.

Content service systems generally make content from multiple content providers (e.g., individual(s), video broadcaster(s), network studio(s), publisher(s), independent filmmaker(s), etc.) available to users over a communication network. For example, a user can access a content service system (e.g., cloud computing system) to consume audio-visual content available from the content service system. The audio-visual content can include video content (e.g., movies, television shows, etc.), audio content (e.g., podcasts), etc. Content service systems may allow users to access audio-visual content under a streaming-based model (e.g., where the user can stream the audio-visual content from the content service system), a rental-based model (e.g., where the user can access the audio-visual content from the content service system for a predefined period of time), a purchase-based model (e.g., where the user can purchase audio-visual content from the content service system for unrestricted access to that content), etc.

Content service systems may make audio-visual content available in different languages. For example, a user may be able to access an original audio recording of an instance of video content (e.g., movie) in a particular language (e.g., Spanish) along with one or more additional audio recordings of the instance of video content in one or more other languages (e.g., English, French, Italian, etc.). The additional audio recordings in different languages other than the original language (e.g., Spanish) are generally referred to as dubbed content, dubbed audio versions, etc. Currently, content service systems have to undergo a significant amount of effort in order to determine which dubbed content to make available for various video content on the content service systems.

BRIEF DESCRIPTION OF DRAWINGS

Various embodiments in accordance with the present disclosure will be described with reference to the drawings, where like designations denote like elements.

DETAILED DESCRIPTION

Content service systems generally allow users to access audio-visual content in one or more different languages. For example, a content service system may allow a user to view video content with audio recordings in multiple different languages. The video content may be viewed using an audio recording in an original language (e.g., the language that the audio for the video content was initially recorded). Additionally, the video content may be viewed using one or more dubbed audio recordings in other languages (e.g., language(s) that the audio for the video content was re-recorded or subsequently recorded).

Currently, content service systems rely on manual processes for selecting which audio content to use as dubbed content for video content. For example, current techniques generally involve manually soliciting audio samples in a desired language (e.g., German) from various speakers and manually listening to the various samples to determine which speaker is producing the most suitable speech. One issue with this approach is that it is operationally burdensome for content service systems due to the amount of time and costs associated with generating dubbed content in multiple different languages for video content. For example, a given instance of video content (e.g., "Movie A") may have several different content entities (e.g., movie characters) that produce speech for the video content. In this example, assuming the content service system wants to make the video content available in "Spanish," the content service system would have to manually listen to several different voice samples for each of the content entities in the video content, and determine the most suitable voice to use for each of the content entities. The content service system would have to repeat this process for each additional language that the video content is to be re-recorded in, significantly increasing the amount of time and cost associated with making dubbed content available for video content.

Additionally or alternatively, selecting audio content (e.g., voice samples) to use for dubbed content with conventional approaches can lead to sub-optimal selection of voices for the dubbed content. For example, because conventional approaches generally rely on the subjective decisions of an individual responsible for selecting voices for dubbed content, the decisions may be made without specific guidelines or quantified measures. This, in turn, can lead to voices for dubbed languages that users (viewing the video content in the dubbed language) find unsuitable. For example, users may be displeased with the voice performance of the dubbed voices for the content entities in the video content, and may forego viewing the video content on the content service system.

As such, embodiments described herein provide techniques that enable a content service platform to automate the selection of audio content for one or more content entities (e.g., character actors) in an instance of audio-visual content (e.g., a movie title, an episode from an episodic title, audio podcast, etc.). As described below, embodiments provide techniques for determining (or predicting), for a given content entity in an instance of audio-visual content (e.g., a movie title) and a set of audio content (e.g., audio samples from different speakers), the audio content that is most suitable for that content entity in the audio-visual content. Embodiments can determine the most suitable audio content to use for a content entity, based on one or more attributes (or characteristics) of the content entity. The attributes, for example, can include, but are not limited to, social attributes, physical attributes, psychological attributes, and the like.

In this manner, embodiments provide an automated tool that enables content service systems to determine which audio content to use when creating dubbed content (e.g., in different languages other than the originally recorded language) for audio-visual content. The techniques described herein can enable content service systems to create dubbed content at a large scale (e.g., millions of titles in hundreds of languages) and make the dubbed content available to users via the content service systems.

Note that as used herein, audio-visual content may refer to content with video components (e.g., video content), content with audio components (e.g., audio content), or combinations thereof. Accordingly, while many of the following embodiments use video content as a reference example of a type of audio-visual content that can be made available (e.g., hosted) on a content service system (e.g., a cloud computing system that enables users to stream various video content), embodiments described herein can be used for a variety of types of content (e.g., audio content, e-reader content, etc.). For example, techniques presented herein can be used to select the most suitable audio content (e.g., voice) for audio narration of text in a book or e-reader. In another example, the techniques presented herein can be used to select the most suitable audio content for a radio or online podcast. Similarly, note that the following references a content service system generally used to stream video content (e.g., movies, television shows, documentaries, etc.). Such reference is used as an example content service system that may determine the most suitable audio content that should be used for a content entity in video content.

Figure 1:
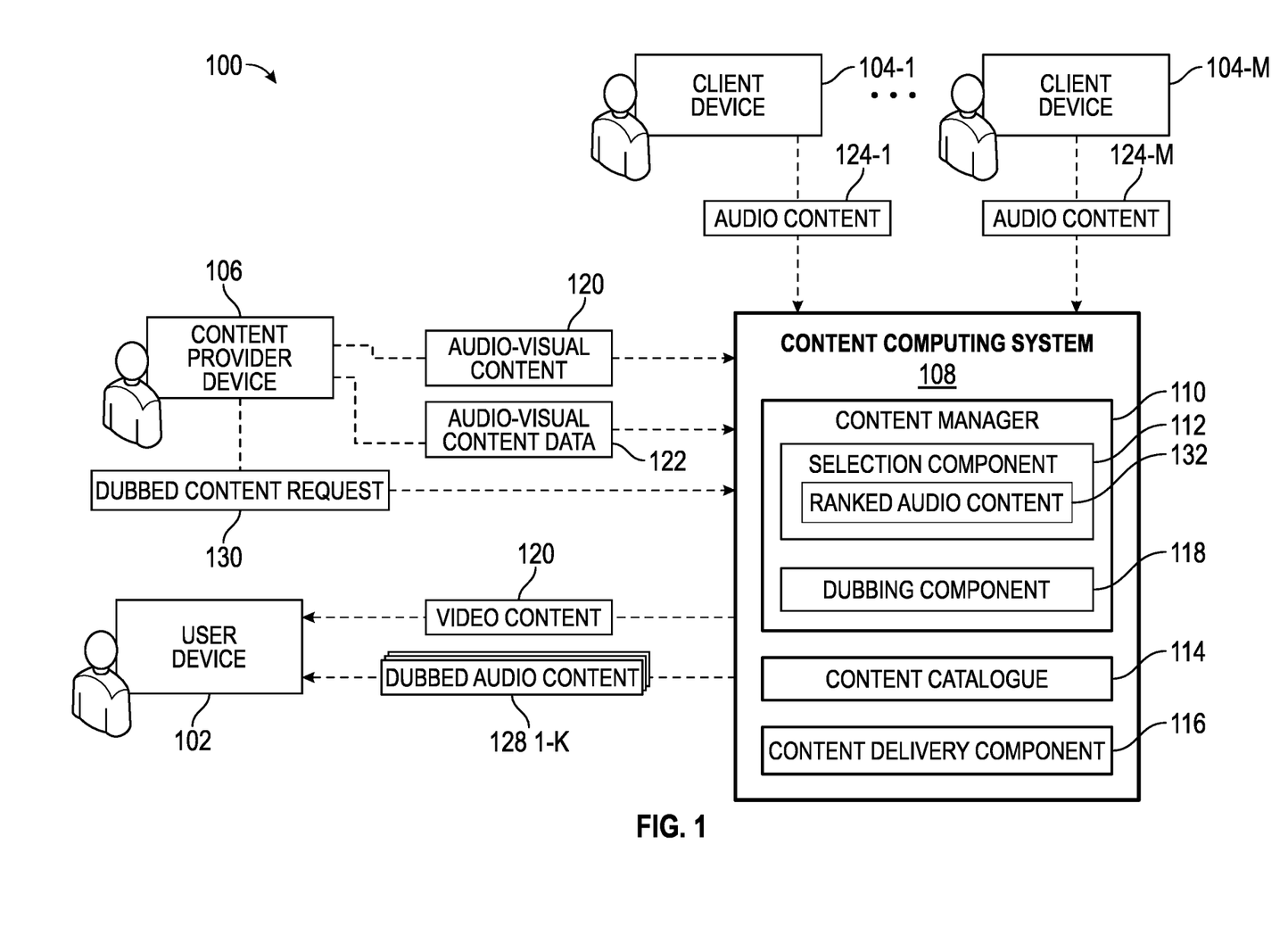
FIG. 1 is a block diagram illustrating an example of a computing environment providing a content service system for delivering content over a network, according to one embodiment.

FIG. 1 is a block diagram illustrating a computing environment 100 providing a content service system for delivering content over a network, according to one embodiment. As shown, the computing environment 100 includes a user device 102, a content provider device 106, and one or more client devices 104 1-M interacting with a content computing system 108 (also referred to herein as a content service system or a content computing service). Although not shown, the devices 102, 104, and 106 may interact with the content computing system 108 via a network (e.g., a wide area network (WAN), local area network (LAN), wireless LAN (WLAN), personal area network (PAN), a cellular network, etc. In a particular embodiment, the network may be the Internet.

User device 102 is representative of a variety of computing devices, including a desktop computer, laptop computer, mobile computer (e.g., a tablet or smartphone), digital media player, video game console, smart television, etc. Similarly, client devices 104 1-M and content provider device 106 are representative of a variety of computing devices, such as a desktop computer, server computer, laptop computer, mobile computer, etc.

The content computing system 108 generally allows a user to access various content (e.g., audio-visual content, such as video content) from one or more different content providers, e.g., for streaming the content. In one embodiment, the content computing system 108 may be located in a cloud environment. As shown, the content computing system 108 includes a content manager 110, a content catalogue 114, and a content delivery component 116. The content catalogue 114 is generally a database that stores content items from one or more content providers. The content delivery component 116 is used to manage delivery of content from the content catalogue 114 to users (e.g., via user device 102). In one embodiment, for example, the content delivery component 116 may enable users to stream and/or download content from the content catalogue 114.

As described below, in some embodiments, the content catalogue 114 may store one or more video packages, each video package including a video file and one or more audio recordings in different languages for the video file. The audio recordings can include, for example, an original audio recording in a particular language (e.g., English) and one or more dubbed audio recordings in other languages (e.g., Spanish, German, Italian, etc.). Although shown within the content computing system 108, the content catalogue 114 and/or the content delivery component 116 may be located elsewhere (e.g., within another network).

The content manager 110 generally provides an interface for a content provider (or other user) to access the content computing system 108. For example, the content manager 110 may allow content providers to update the content items (or portions of the content items) that are made available to users via the content computing system 108, allow content providers to view performance data regarding their content items, request the content computing system 108 to generate dubbed versions of content items, etc. The content manager 110 can enable content providers to send or upload their content for storage in the content computing system 108 (e.g., in the content catalogue 114). The content manager 110 may enable content providers to upload content individually or in bulk for storage in the content computing system 108 (e.g., in the content catalogue 114).

In one particular embodiment, the content manager 110 can be used to manage information regarding attributes of one or more content entities in an audio-visual content file. For example, the attribute information may be received from a video content provider and stored in a database (e.g., content catalogue 114). The attribute information may be later retrieved when determining which audio content to use for a given content entity in an audio-visual file.

A content provider can use a content provider device 106 to access the content computing system 108. In one example, a content provider may access the content computing system 108 via a web browser on a content provider device 106. In another example, a content provider may access the content computing system 106 via an application executing on a content provider device 106. In these examples, the web browsers and/or applications on the content provider device 106 may directly interface with the content manager 110.

Similarly, users can access the content computing system 108 via user device(s) 102 and client devices 104. In one example, a user may access the content computing system 108 via a web browser on a user device 102 or client device 104. In another example, a user may access the content computing system 108 via an application executing on a user device 102 or client device 104. In these examples, the web browsers and/or applications on the user device 102 may directly interface with the content delivery component 116 and/or the content manager 110. The content delivery component 116, for example, may allow a user to search for (and/or request) different types of content and/or a given content provider, and access various content. In response to a request for a particular content item, the content delivery component 116 may deliver the content (e.g., via streaming, accepting a download request, etc.) to the users (e.g., via user devices 102).

As noted, conventional methods for selecting audio content to use for generating dubbed versions of audio-visual content can involve a significant amount of effect as well as lead to sub-optimal quality of dubbed content. To address this, embodiments provide techniques and systems for selecting audio content for one or more content entities (e.g., character actors) in an instance of audio-visual content. As shown, the content manager 110 includes a selection component 112 and a dubbing component 118, each of which can include software, hardware, or combinations thereof. The selection component 112 and the dubbing component 118 are generally configured to implement one or more techniques described herein.

The selection component 112, for example, is generally configured to select audio content to use for a content entity in audio-visual content. As described in more detail below, the selection component 112 may receive a set of audio content 124 1-M from different speakers via the client devices 104 1-M. In one embodiment, the set of audio content 124 1-M can include audio samples from human speakers in one or more languages. In another embodiment, the set of audio content 124 1-M can include artificially generated audio samples (e.g., from artificially generated human voices). In yet another embodiment, the set of audio content 124 1-M can include a set of audio samples from human speakers and a set of audio samples from artificially generated human voices. The selection component 112 may store the audio content 124 in a database (e.g., content catalogue 114).

The selection component 112 can receive audio-visual content 120 and audio-visual content data 122 (including information or metadata associated with the audio-visual content 120) from a content provider via the content provider device 106. The audio-visual content 120, for example, can include video content (or a video file) and one or more associated audio content (or audio files). In one embodiment, the audio content within the audio-visual content 120 may include an original audio recording(s) in a particular language(s) containing the dialogue (or speech) of the content entities (e.g., characters) in the video content. In some cases, the particular language(s) may be the language that the video content was originally (or initially) recorded in. In some cases, the particular language(s) may be the language that the video content is made available to the content computing system 108. In one embodiment, the audio-visual content data 122 can include information regarding the content entities (e.g., characters) in the audio-visual content 120. For example, such information can include one or more attributes (or attribute information) characterizing each of the content entities (e.g., Character A, Character B, etc.) in the audio-visual content 120. The selection component 112 may store the audio-visual content data 122 in a database (e.g., content catalogue 114).

The content manager 110 may receive a dubbed content request 130 via the content provider device 106. The dubbed content request 130 may request the content manager 110 to generate dubbed content for the audio-visual content 120. In response to receiving the dubbed content request 130, the selection component 112 may select a particular audio content 124 from among a set of audio content (e.g., audio content 124 1-M) that is most suitable (e.g., according to predefined criteria) for using as dubbed content for a particular content entity in the audio-visual content 120. The dubbed content request 130 can specify a target language for the dubbed audio content, the particular set of audio samples (e.g., the set of audio content 124) to select from, etc.

In one embodiment, the selection component 112 can evaluate the information (e.g., audio-visual content 120, audio-visual content data 122, audio content 124, etc.) with one or more machine learning models (or machine learning techniques) to select the particular audio content 124 from the set of audio content 124 1-M to use for the dubbed content. In one embodiment, the selection component 112 can rank the set of audio content 124 1-M (e.g., from most suitable to least suitable, or vice versa) and generate ranked audio content 132. The selection component 112 may provide the ranked audio content 132 to the dubbing component 118.

The dubbing component 118 is generally configured to assist with the creation of dubbed content, based on the ranked audio content 132. The dubbing component 118, for example, can use the audio content 124 with the highest ranking in the ranked audio content 132 as the audio content for the particular content entity in the audio-visual content 120. The dubbing component 118 may generate an audio file that includes the dialogue of the content entity recorded using the voice associated with the audio content 124 with the highest ranking. As noted, the voice associated with the audio content 124 with the highest ranking may be a human voice or an artificially generated voice.

As shown in FIG. 1, the content computing system 108 can provide (or make accessible) the audio-visual content 120 along with the dubbed audio content 128 1-K associated with the audio-visual content 120 to a user. For example, the user, via the user device 102, may select to view (e.g., stream) the audio-visual content 120 in a dubbed language corresponding to one of the dubbed audio content 128 1-K.

Note that while FIG. 1 depicts the content computing system 108 with a single content manager 110, content catalogue 114, and content delivery component 116, in some embodiments, the content computing system 108 can include multiple content managers 110, content catalogues 114, and content delivery components 116. Similarly, although FIG. 1 depicts the content manager 110, content catalogue 114, and content delivery component 116 as being within a single computing system, the content manager(s) 110, content catalogue(s) 114, and/or content delivery component(s) 116 may be distributed across multiple computing systems within the content computing system 108.

Further, note that FIG. 1 depicts a reference example of a computing environment 100 in which the techniques presented herein can be used and that the techniques presented herein can be used in different computing environments. For example, in some embodiments, the selection component 112 may access a database of voice samples (or voice content) to generate the ranked audio content 132.

Figure 2:
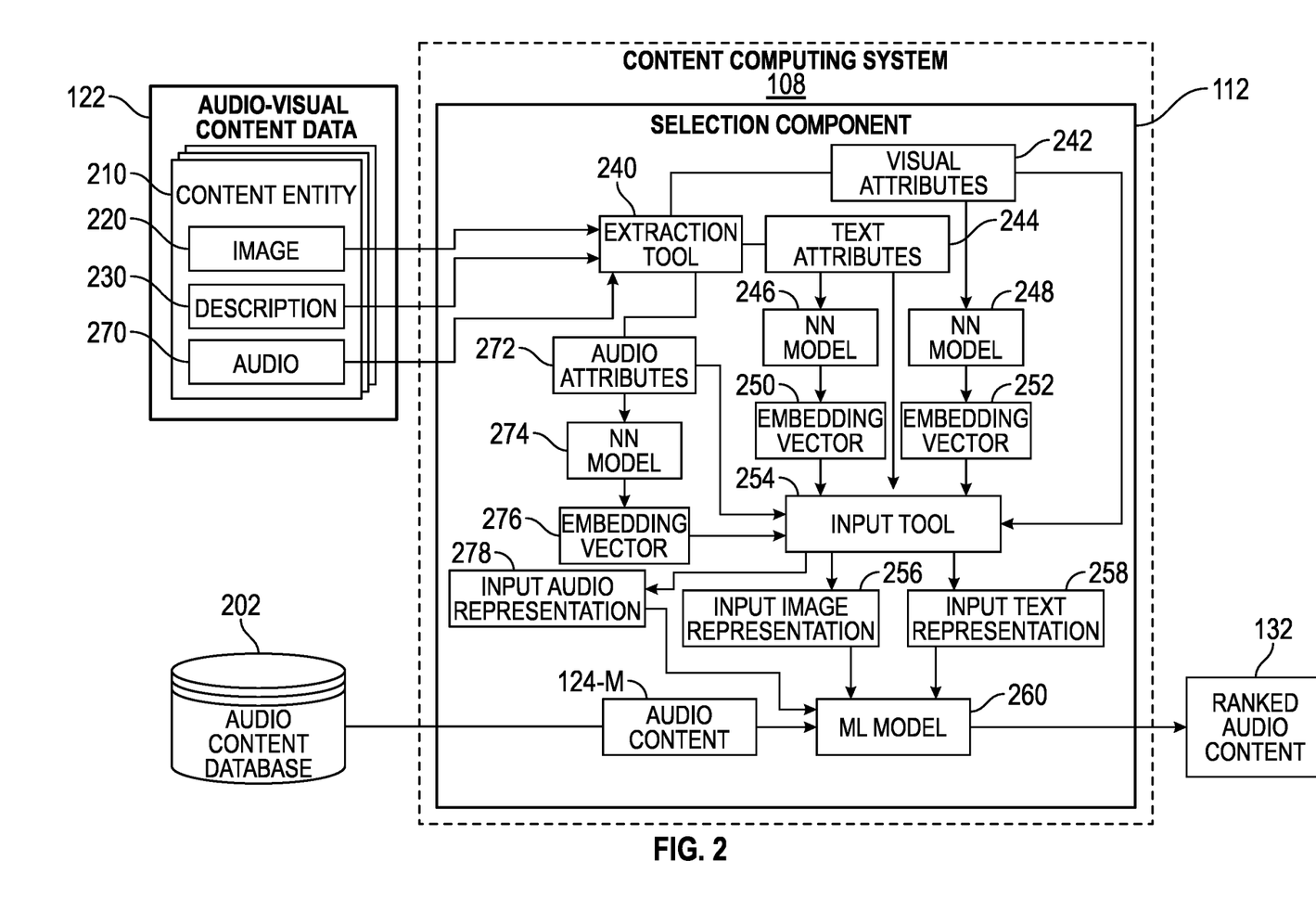
FIG. 2 is a block diagram further illustrating components of the content service system illustrated in FIG. 1, according to one embodiment.

FIG. 2 is a block diagram further illustrating components of the content computing system 108, described relative to FIG. 1, according to one embodiment. In this particular embodiment, a user (e.g., content provider) can access the content computing system 108 via a computing device (e.g., content provider device 106). For example, the computing device may include one or more components of a client server application (or other distributed application) (not shown) which can communicate with the content computing system 108. In some cases, the application may be a "thin" client where the processing is largely directed by the application, but performed by computing systems (e.g., content manager 110) of the content computing system 108 or a conventional software application installed on the content provider device 106. In some examples, the content provider can use a web browser (not shown) of the content provider device 106 to access the content computing system 108.

Here, the selection component 112 can receive audio-visual content data 122 including information regarding one or more content entities 210 (e.g., actors) for an instance of video content (e.g., movie title). For example, the audio-visual content data 122 can include one or more images 220 of the content entity 210 for the video content, a text description 230 describing one or more attributes or classifiers of the content entity 210, audio content 270 of the content entity 210 for the video content, etc.

In this embodiment, selection component 112 can include an extraction tool 240 configured to receive (or retrieve) the image(s) 220, the text description 230, and the audio content 270. The extraction tool 240 can extract one or more visual attributes 242 (or visual features or visual markers) of the content entity 210 from the image 220. For example, given an image 220, I, of the content entity, the extraction tool 240 can extract the visual attributes 242, $I_a$, using classifiers, such as gender, age, etc. Similarly, the extraction tool 240 can extract one or more text attributes 244 (also referred to as textual attributes or text(ual) features) of the content entity from the text description 230 (or textual description). For example, given an a text description 230, T, the extraction tool 240 can extract text attributes 244, $T_a$, which can include, e.g., demographic attributes, physical attributes, geographical origin, social status, etc. Additionally, the extraction tool 240 can extract one or more audio attributes 272 (or audio features) of the content entity from the audio content 270. The audio attributes 272 can include, but are not limited to, the vocal spectrum envelope, tone, pitch, etc., of the content entity in the video content.

The selection component 112 may input the visual attributes 242, the text attributes 244, and the audio attributes 272 into respective neural network (NN) models 248, 246, and 274 to generate respective embedding vectors 252, 250, and 276. Note that while FIG. 2 depicts a separate NN model being used for each of the visual attributes 242, text attributes 244, and audio attributes 272, in some embodiments, a single NN model can be used to generate the embedding vectors 252, 250, and 276, based on the visual attributes 242, text attributes 244, and audio attributes 272. The selection component 112 can include an input tool 254 configured to receive (i) the embedding vectors 252, 250, and 276, (ii) the visual attributes 242, (iii) the text attributes 244, and (iv) the audio attributes 272, and generate an input image representation 256, an input text representation 258, and an input audio representation 278. In particular, the input image representation 256 ($I_f$) may be generated based on concatenating the visual attributes 242 ($I_a$) with the embedding vector 252 ($I_e$), such that $I_f=(I_a, I_e)$. Similarly, the input text representation 258 ($T_f$) may be generated based on concatenating the text attributes 244 ($T_a$) with the embedding vector 250 ($T_e$), such that $T_f=(T_a, T_e)$. Additionally, the input audio representation 278 ($A_f$) may be generated based on concatenating the audio attributes 272 ($A_a$) with the embedding vector 276 ($A_e$), such that $A_f=(A_a, A_e)$.

The selection component 112 may input the input image representation 256, the input text representation 258, the input audio representation 278, and a set of audio content 124 1-M into a machine learning (ML) model 260 configured to determine (or output) a ranking of the set of audio content 124 1-M in terms of suitability for using as the voice content for the content entity 210 of the audio-visual content 120. In this embodiment, the set of audio content 124 1-M may be retrieved from an audio content database 202 (e.g., representative of one of the content catalogue 114 depicted in FIG. 1). In one embodiment, the ML model may be trained using attribute data (e.g., visual, text, and audio data) of content entities and voice samples of the content entities. The ML model 260 can be configured to evaluate the input image representation 256, the input text representation 258, and the input audio representation 278 and to determine an ordering of the M samples of audio content 124 1-M in terms of suitability (based on a predetermined condition). For example, assuming the ML model 260 (M) is given ($I_f$, $T_f$, $A_f$, $\{V_i\}$), where $\{V_i\}_{i=1}^{m}$ is the set of m samples of audio content 124 1-M, the ML model 260 can output an order O over indices 1 to m, such that $V_{O_i} > V_{O_j} \forall O_i > O_j$.

In one embodiment, the suitability of a particular audio content may be based on a similarity function. For example, the ML model 260 can be trained to output a measure of similarity of each audio content 124 to the set of attributes for a given content entity. In this example, the audio content 124 with the highest measure of similarity (out of the audio content 124 1-M) to the set of attributes can be ranked the highest ($V_{O_i}$), whereas the audio content 124 with the lowest measure of similarity to the set of attributes can be ranked the lowest ($V_{O_j}$). Note, however, that this is merely an example and that other metrics can be used to determine the suitability ranking. As shown in FIG. 2, the selection component 112 may output the ranked audio content 132 to other components of the content computing system 108 (e.g., for further processing). In one particular embodiment, for example, the ranked audio content 132 can be provided to the dubbing component 118 to assist with generating dubbed content for the content entity 210, using the speaker associated with the highest ranked audio content 124.

Note that FIG. 2 depicts merely a reference example of a workflow that can be used to select voice content for a content entity in video content and that other configurations of the workflow can be used. For example, one or more components of the selection component 112 may be combined into a single component or distributed across multiple components.

Figure 3:
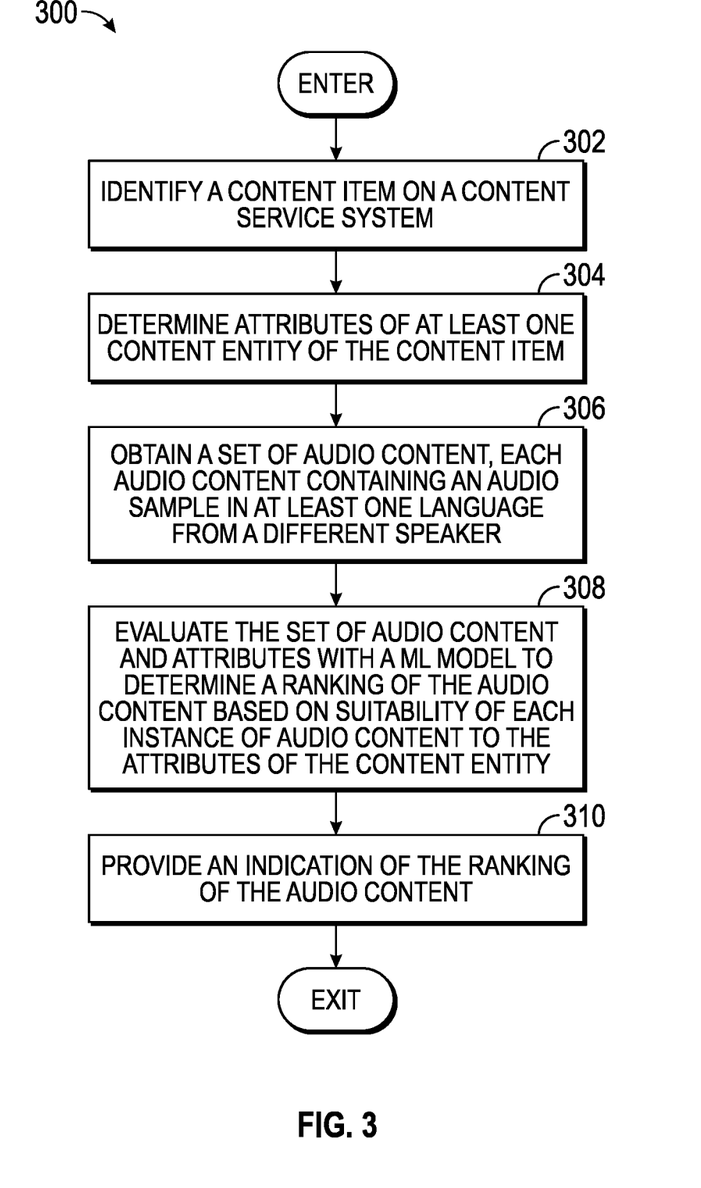
FIG. 3 is a flowchart of a method for selecting audio content for audio-visual content, according to one embodiment.

FIG. 3 is a flowchart of a method 300 for selecting audio content for video content, according to one embodiment. The method 300 may be performed by one or more components (e.g., selection component 112) of a content computing system (e.g., content computing system 108).

The method 300 may enter at block 302, where the content computing system identifies at least one content item on the content computing system. The content item can include an instance of audio-visual content. For instance, the audio-visual content can include video content (e.g., movie, episode, etc.) along with the corresponding audio for the video content, audio content (e.g., podcast, audio book, etc.), etc. More generally, the content item can include a video content item, a text content item, an audio content item, etc. The content item may be made accessible to one or more users (e.g., for streaming, purchase, renting, etc.) via the content computing system.

At block 304, the content computing system determines attributes of at least one content entity of the content item. Assuming the content item is audio-visual content, for example, the content entity can include a character of the audio-visual content. Using this example, in some cases, the attributes of the content entity can include visual attributes of the content entity, based on an image of the content entity. For instance, the content computing system can obtain images of the content entity and extract visual attributes, such as age, gender, etc. of the content entity. Other examples of visual attributes that can be extracted from images of the content entity include, but are not limited to, size, physique, health state, etc.

In other cases, the attributes of the content entity can include text attributes characterizing (or describing) the content entity. For example, assuming the content item is audio-visual content (e.g., a movie title), the content computing system can receive information describing the one or more content entities in the audio-visual content. The information can be based on a script of the audio-visual content. For example, the script may include a list of the content entities (e.g., cast), along with a description of the various physical, social, and psychological attributes of each of the content entities for the audio-visual content. The physical markers can include, for example, age, gender, size, physique, etc. The social markers can include, for example, profession, regional origin, social class, etc. The psychological attributes can include, for example, personality, attitudes, emotions, etc.

Assume, for example, that the script for an audio-visual content ("Action Movie") specifies that a content entity ("Detective 1") is "A street smart veteran detective dedicated to his job. Detective is a male in his late 50s. Detective is from Boston and has an authoritative personality." Given this text description, the content computing system can determine that the attributes of the content entity include, but is not limited to, male, late 50s, Boston accent, authoritative personality, etc.

Additionally or alternatively, the attributes of the content entity can include audio attributes characterizing (or describing) the audio content of the content entity. For example, assuming the content item is audio-visual content (e.g., a movie title), the content computing system can extract one or more audio attributes (or features) of the content entity in the audio-visual content. The audio attributes can include, for example, the vocal spectrum envelope of the content entity which can be used to match to vocal spectrum envelopes of other voices in a voice bank.

At block 306, the content computing system can obtain a set of audio content (e.g., audio content 124 1-M). Each audio content can include an audio sample in at least one language from a different speaker. In one embodiment, the content computing system can retrieve the set of audio content from a database (e.g., content catalogue 114, audio content database 202, etc.). In another embodiment, the content computing system can receive the set of audio content from the different speakers, e.g., via client devices 104.

At block 308, the content computing system can evaluate the set of audio content and attributes with a ML model (e.g., ML model 260) to determine a ranking of the audio content based on suitability of each instance of audio content to the attributes of the content entity. In one embodiment, the suitability of each instance of audio content may be based on a similarity metric. For example, the ML model may be trained to output a measure of the similarity of a particular instance of audio content to the attribute values of the content entity. At block 310, the content computing system can provide an indication of the ranking of the audio content. For example, the content computing system can send an indication of the ranking of the audio content to an automated dubbing system (e.g., dubbing component 118).

Figure 4:
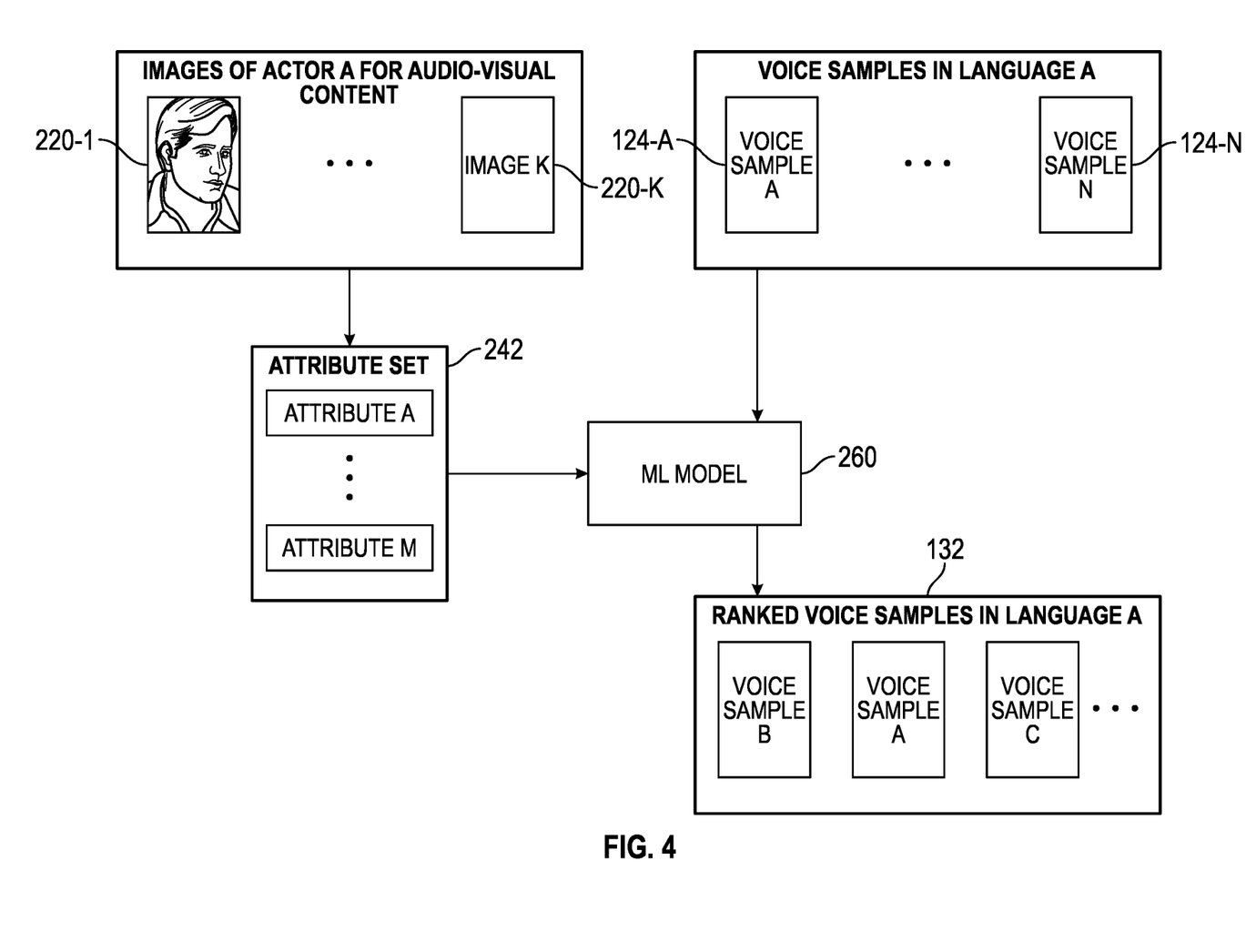
FIG. 4 illustrates an example scenario of ranking voice samples based on visual attributes of a content entity, according to one embodiment.

FIG. 4 illustrates an example scenario of ranking voice samples based on visual attributes of a content entity, according to one embodiment. As shown in this embodiment, the content computing system 108 can extract a set of visual attributes 242 (e.g., age, gender, etc.) for a content entity ("Actor A") for an instance of audio-visual content 120, based on one or more images 220 1-K of the content entity. Here, the set of visual attributes 242 is input into the ML model 260 along with a set of voice samples (e.g., audio content 124 A-N) in a particular language A (e.g., German). The ML model 260 determines, for each of the voice samples, a measure of similarity of the voice sample to the set of attributes 242, and outputs a ranked set of voice samples in language A (e.g., ranked audio content 132), based on the measures of similarity.

Figure 5:
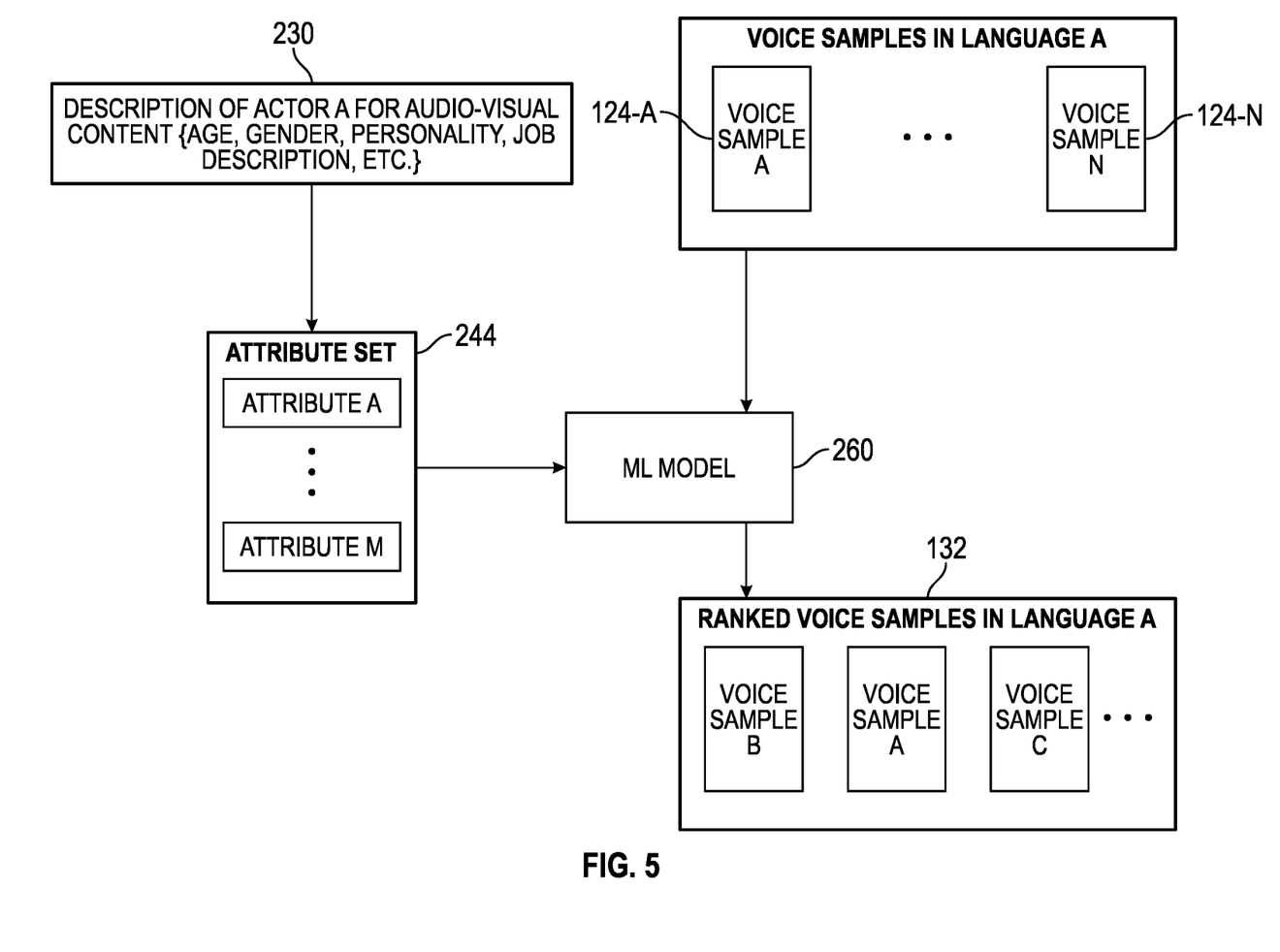
FIG. 5 illustrates an example scenario of ranking voice samples based on text attributes of a content entity, according to one embodiment.

FIG. 5 illustrates an example scenario of ranking voice samples based on text attributes of a content entity, according to one embodiment. As shown in this embodiment, the content computing system 108 can extract a set of text attributes 244 (e.g., age, gender, etc.) for a content entity ("Actor A") for an instance of audio-visual content 120, based on the description of the Actor A for the audio-visual content (e.g., description 230). Here, the set of text attributes 244 is input into the ML model 260 along with a set of voice samples (e.g., audio content 124 A-N) in a particular language A (e.g., German). The ML model 260 determines, for each of the voice samples, a measure of similarity of the voice sample to the set of attributes 244, and outputs a ranked set of voice samples in language A (e.g., ranked audio content 132), based on the measures of similarity.

Figure 6:
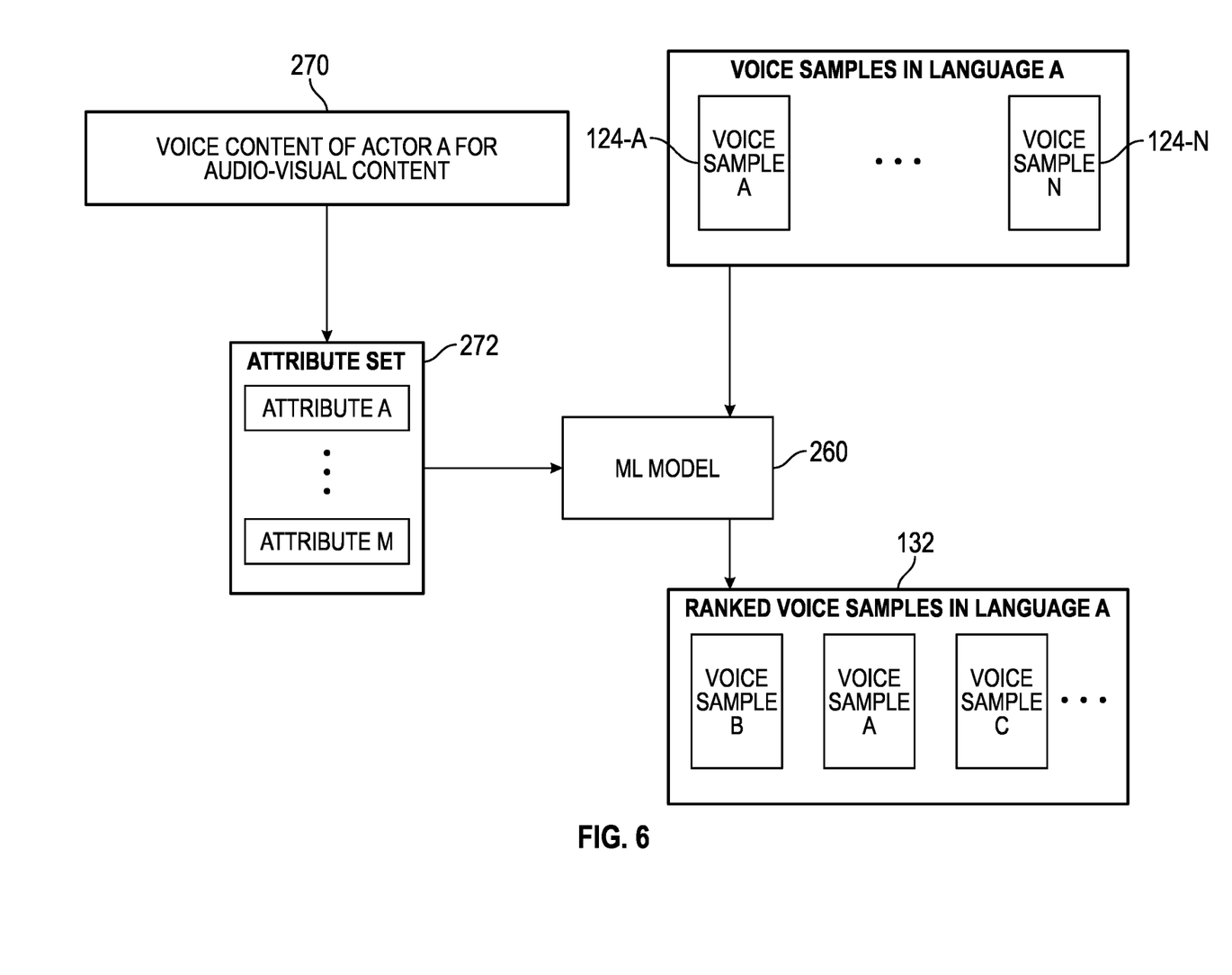
FIG. 6 illustrates an example scenario of ranking voice samples based on audio attributes of a content entity, according to one embodiment.

FIG. 6 illustrates an example scenario of ranking voice samples based on audio attributes of a content entity, according to one embodiment. As shown in this embodiment, the content computing system 108 can extract a set of audio attributes 272 for a content entity ("Actor A") for an instance of audio-visual content 120, based on the original audio content of the Actor A for the audio-visual content (e.g., audio content 270). Here, the set of audio attributes 272 is input into the ML model 260 along with a set of voice samples (e.g., audio content 124 A-N) in a particular language A (e.g., German). The ML model 260 determines, for each of the voice samples, a measure of similarity of the voice sample to the set of attributes 272, and outputs a ranked set of voice samples in language A (e.g., ranked audio content 132), based on the measures of similarity.

Figure 7:
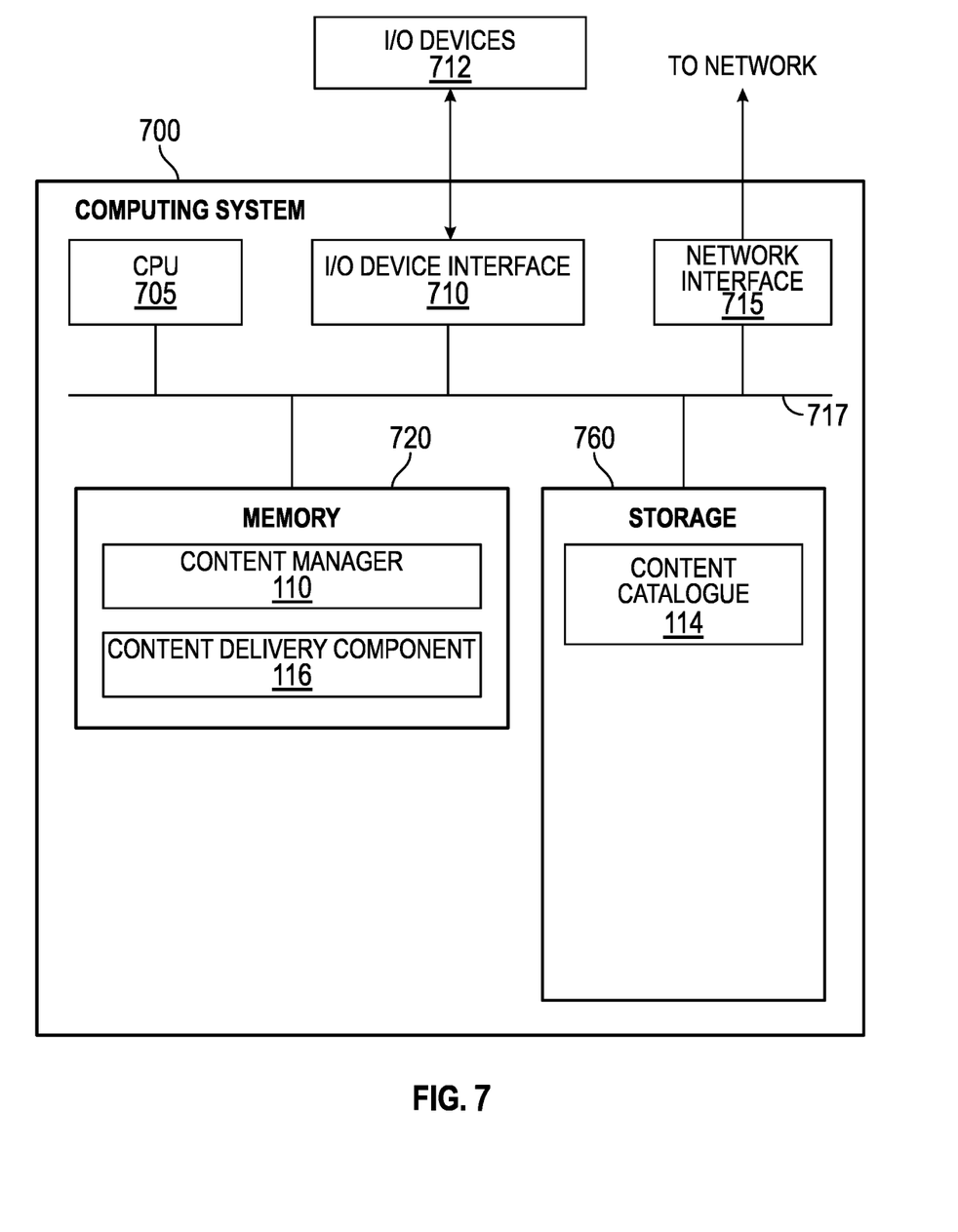
FIG. 7 illustrates a computing system configured to select audio content for audio-visual content, according to one embodiment.

FIG. 7 illustrates a computing system 700 configured to select audio content for video content, according to one embodiment. As shown, the computing system 700 includes, without limitation, a central processing unit (CPU) 705, a network interface 715, a memory 720, and storage 760, each connected to a bus (or interconnect) 717. The computing system 700 may also include an I/O device interface 710 connecting I/O devices 712 (e.g., keyboard, mouse, and display devices) to the computing system 700. Further, in context of this disclosure, the computing elements shown in the computing system 700 may correspond to a physical computing system (e.g., a system in a data center) or may be a virtual computing instance executing within a computing cloud. In one embodiment, the computing system 700 can be an example of the computing system illustrated in FIG. 1 (e.g., content manager 110).

The CPU 705 retrieves and executes programming instructions stored in the memory 720 as well as stores and retrieves application data residing in the memory 720. The bus 717 is used to transmit programming instructions and application data between CPU 705, I/O devices interface 710, storage 760, network interface 715, and memory 720. Note CPU 705 is included to be representative of a single CPU, multiple CPUs, a single CPU having multiple processing cores, and the like. Memory 720 is generally included to be representative of a random access memory. The storage 760 may be a disk drive storage device. Although shown as a single unit, storage 760 may be a combination of fixed and/or removable storage devices, such as fixed disc drives, removable memory cards, or optical storage, network attached storage (NAS), or a storage area-network (SAN). The storage 760 includes content catalogue 114, which is described in more detail above. Illustratively, the memory 720 includes the content manager 110 and the content delivery component 116, which are described in more detail above.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., content manager 110, content catalogue 114, and content delivery component 116) or related data available in the cloud. For example, the content manager 110 could execute on a computing system in the cloud and determine a ranking of audio content for a content entity in video content. In such a case, the content manager 110 could generate the availability strategy and store information associated with the availability strategy at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A system, comprising:
a processor; and
a memory storing one or more applications, which, when executed on the processor performs an operation comprising:
identifying an instance of audio-visual content accessible to one or more first users over a communication network, wherein the instance of audio-visual content is associated with a first instance of audio content in a first language;
determining attributes of a content entity in the instance of audio-visual content, wherein the attributes include one or more visual markers of the content entity;
obtaining a textual description of the content entity, wherein determining the attributes comprises extracting one or more characteristics of the content entity from the textual description, wherein at least one of the attributes is based on the one or more characteristics;
extracting one or more audio attributes of the content entity from the first instance of audio content associated with the instance of audio-visual content, wherein at least one of the attributes is based on the one or more audio attributes;
obtaining a plurality of audio content samples in a second language;
determining, for each of the audio content samples, a measure of similarity to the attributes of the content entity based on evaluating the attributes and the plurality of audio content samples with a machine learning model, wherein the attributes of the content entity include the one or more audio attributes, the one or more characteristics, and the one or more visual markers;
ranking the plurality of audio content samples based on the measures of similarity; and
providing an indication of the ranked plurality of audio content samples.

2. The system of claim 1, wherein:
the plurality of audio content samples are associated with a plurality of human speakers;
a first human speaker of the plurality of human speakers is associated with a first audio content sample of the plurality of audio content samples having a highest measure of similarity out of the plurality of audio content samples; and
a voice of the first human speaker is selected for generating a second instance of audio content associated with the instance of audio-visual content in the second language.

3. A computer-implemented method, comprising:
identifying a content entity associated with a content item that is accessible to one or more users in a first language over a communication network;
determining, based on information associated with the content item, attributes of the content entity, wherein the attributes include one or more visual markers of the content entity;
wherein the information associated with the content item comprises a textual description of the content entity, and determining the attributes comprises extracting one or more characteristics of the content entity based on the textual description;

wherein the information associated with the content item comprises audio content associated with the content entity, and determining the attributes comprises extracting one or more audio attributes of the content entity from the audio content;

obtaining a plurality of audio content samples in a second language, each audio content sample comprising a different audio sample of a portion of speech of the content entity in the second language;

determining, based on evaluating the plurality of audio content samples and the attributes of the at least one content entity with a machine learning model, a first audio content sample that satisfies a predetermined condition, wherein the attributes of the at least one content entity include the one or more audio attributes, the one or more characteristics, and the one or more visual markers;

wherein the predetermined condition comprises a highest measure of similarity to the attributes of the content entity; and providing an indication to use a source of the first audio content sample for generating an instance of audio content in the second language for speech of the content entity in the content item.

4. The computer-implemented method of claim 3, wherein the one or more visual markers comprises at least one of an age of the content entity or a gender of the content entity.

5. The computer-implemented method of claim 3, further comprising generating, based on evaluating the one or more visual markers with a neural network, a vector comprising an embedding of the one or more visual markers.

6. The computer-implemented method of claim 5, wherein the first audio content sample is determined further based on an evaluation of the vector with the machine learning model.

7. The computer-implemented method of claim 3, wherein the one or more characteristics of the content entity comprises at least one: a personality of the content entity, a geographical origin of the content entity, an age of the content entity, a gender of the content entity, a job of the content entity, or a social status of the content entity.

8. The computer-implemented method of claim 3, further comprising generating, based on evaluating the one or more characteristics with a neural network model, an audio embedding vector, a visual embedding vector, and a textual embedding vector.

9. The computer-implemented method of claim 8, wherein the first audio content sample is determined further based on an evaluation of the vector with the machine learning model.

10. The computer-implemented method of claim 3, further comprising generating, based on evaluating the one or more audio attributes of the content entity, a vector comprising an embedding of the one or more audio attributes, wherein the first audio content sample is determined further based on an evaluation of the vector with the machine learning model.

11. The computer-implemented method of claim 3, wherein the source of the first audio content sample comprises a human voice or an artificial generated human voice.

12. A computer-readable storage medium storing instructions, which, when executed on one or more computing systems, perform an operation comprising:

identifying a content entity associated with a content item that is accessible to one or more users in a first language over a communication network;

determining, based on information associated with the content item, attributes of the at least one content entity, wherein the attributes include one or more visual markers of the content entity;

wherein the information associated with the content item comprises a textual description of the content entity, and determining the attributes comprises extracting one or more characteristics of the content entity based on the textual description;

wherein the information associated with the content item comprises audio content associated with the content entity, and determining the attributes comprises extracting one or more audio attributes of the content entity from the audio content;

obtaining a plurality of audio content samples in a second language, each audio content sample comprising a different audio sample of a portion of speech of the content entity in the second language;

determining, based on evaluating the plurality of audio content samples and the attributes of the at least one content entity with a machine learning model, a first audio content sample that satisfies a predetermined condition, wherein the attributes of the at least one content entity include the one or more audio attributes, the one or more characteristics, and the one or more visual markers;

wherein the predetermined condition comprises a highest measure of similarity to the attributes of the content entity; and providing an indication to use a source of the first audio content sample for generating an instance of audio content in the second language for speech of the content entity in the content item.

13. The computer-readable storage medium of claim 12, wherein the one or more visual markers comprises at least one of an age of the content entity or a gender of the content entity.

14. The computer-readable storage medium of claim 12, wherein the operation includes generating, based on evaluating the one or more visual markers with a neural network, a vector comprising an embedding of the one or more visual markers.

15. The computer-readable storage medium of claim 14, wherein the first audio content sample is determined further based on an evaluation of the vector with the machine learning model.

16. The computer-readable storage medium of claim 12, wherein the one or more characteristics of the content entity comprises at least one: a personality of the content entity, a geographical origin of the content entity, an age of the content entity, a gender of the content entity, a job of the content entity, or a social status of the content entity.

17. The computer-readable storage medium of claim 12, wherein the operation includes generating, based on evaluating the one or more characteristics with a neural network, a vector comprising an embedding of the one or more characteristics.

18. The computer-readable storage medium of claim 16, wherein the first audio content sample is determined further based on an evaluation of the vector with the machine learning model.

* * * * *